March 2, 1954 — R. H. SCHUMAN — 2,670,632
MACHINE TOOL TRANSMISSION AND CONTROL THEREFOR
Filed Oct. 16, 1951 — 6 Sheets-Sheet 1
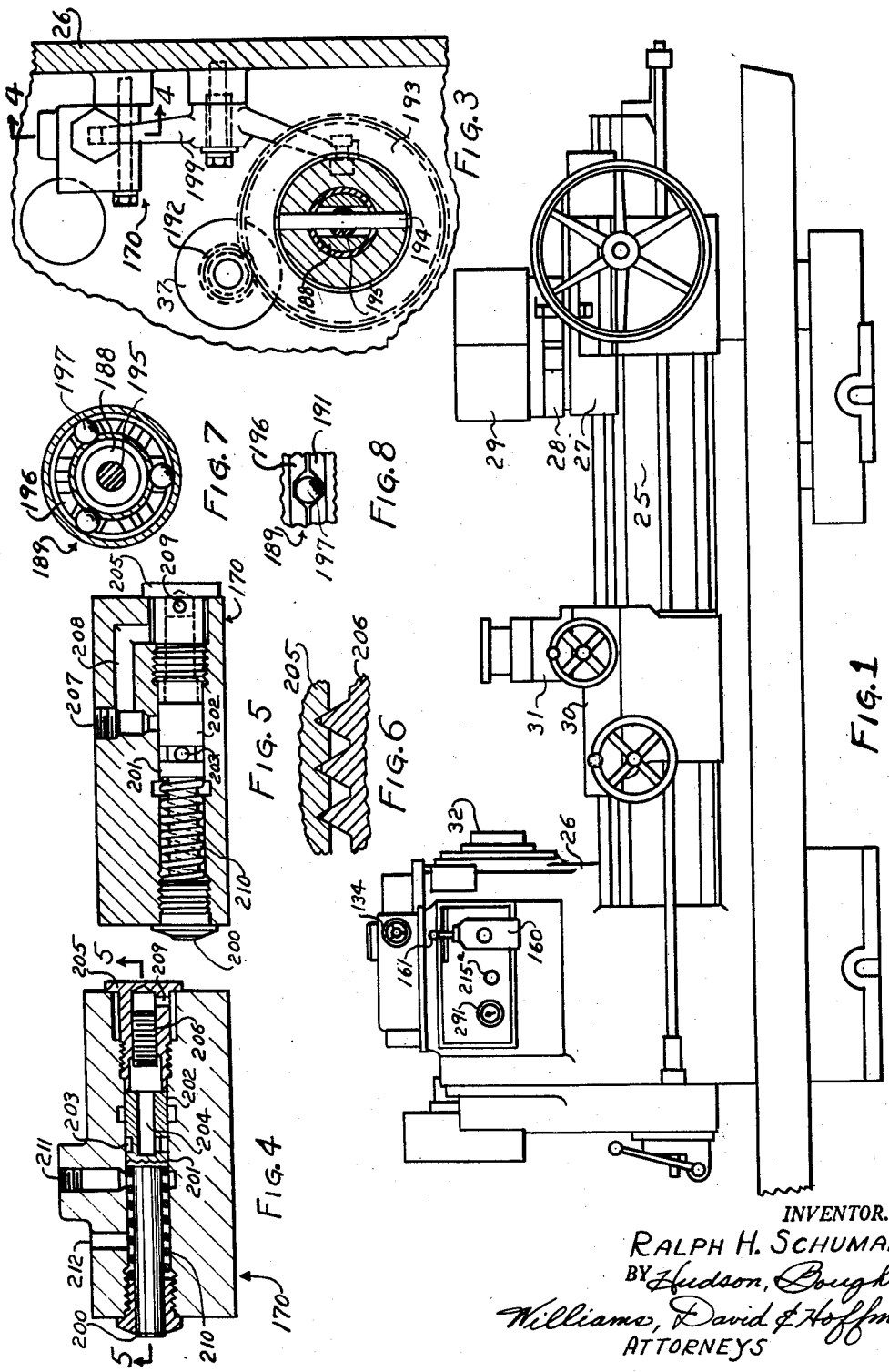
INVENTOR.
RALPH H. SCHUMAN
BY Hudson, Boughton
Williams, David & Hoffman
ATTORNEYS

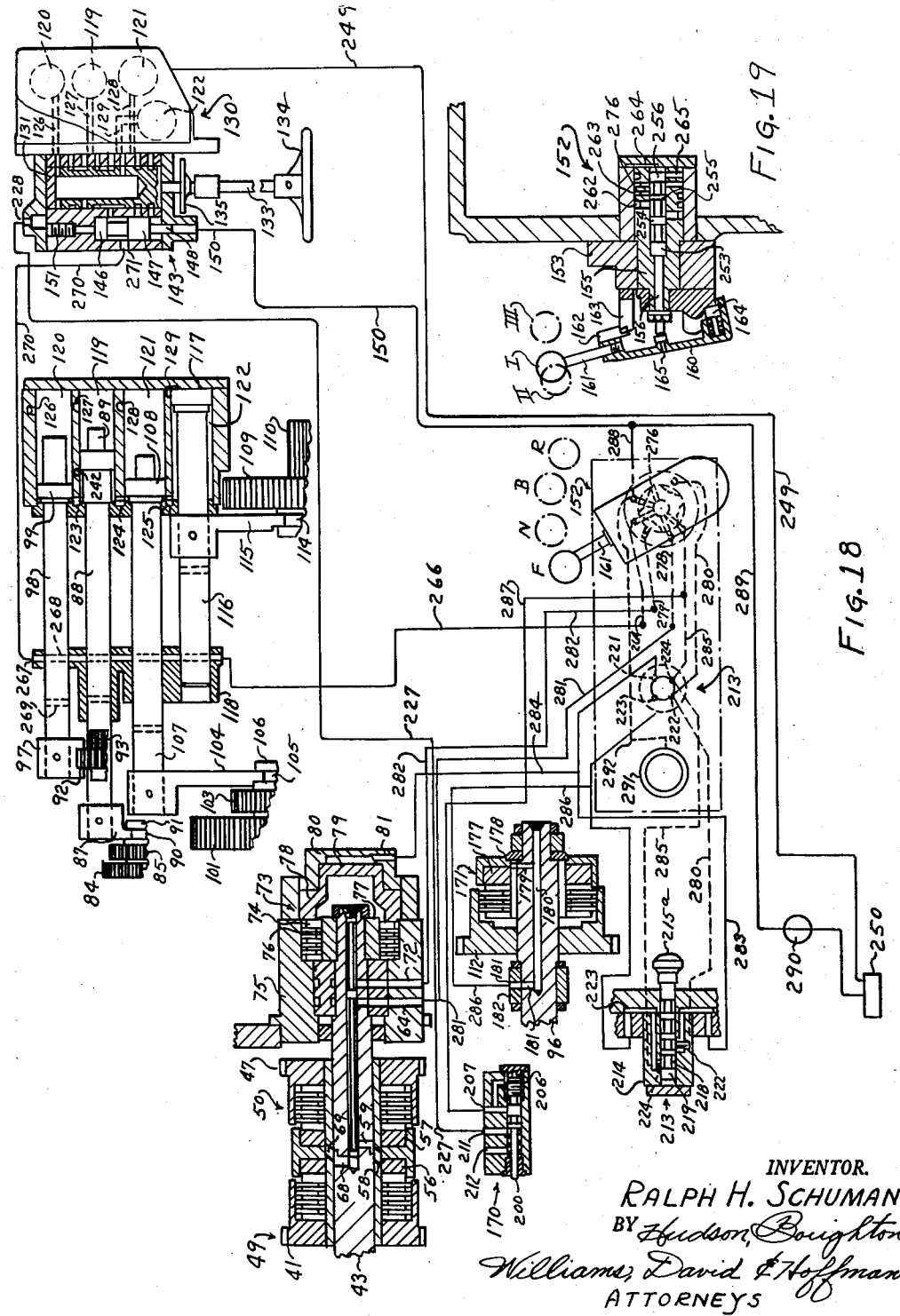

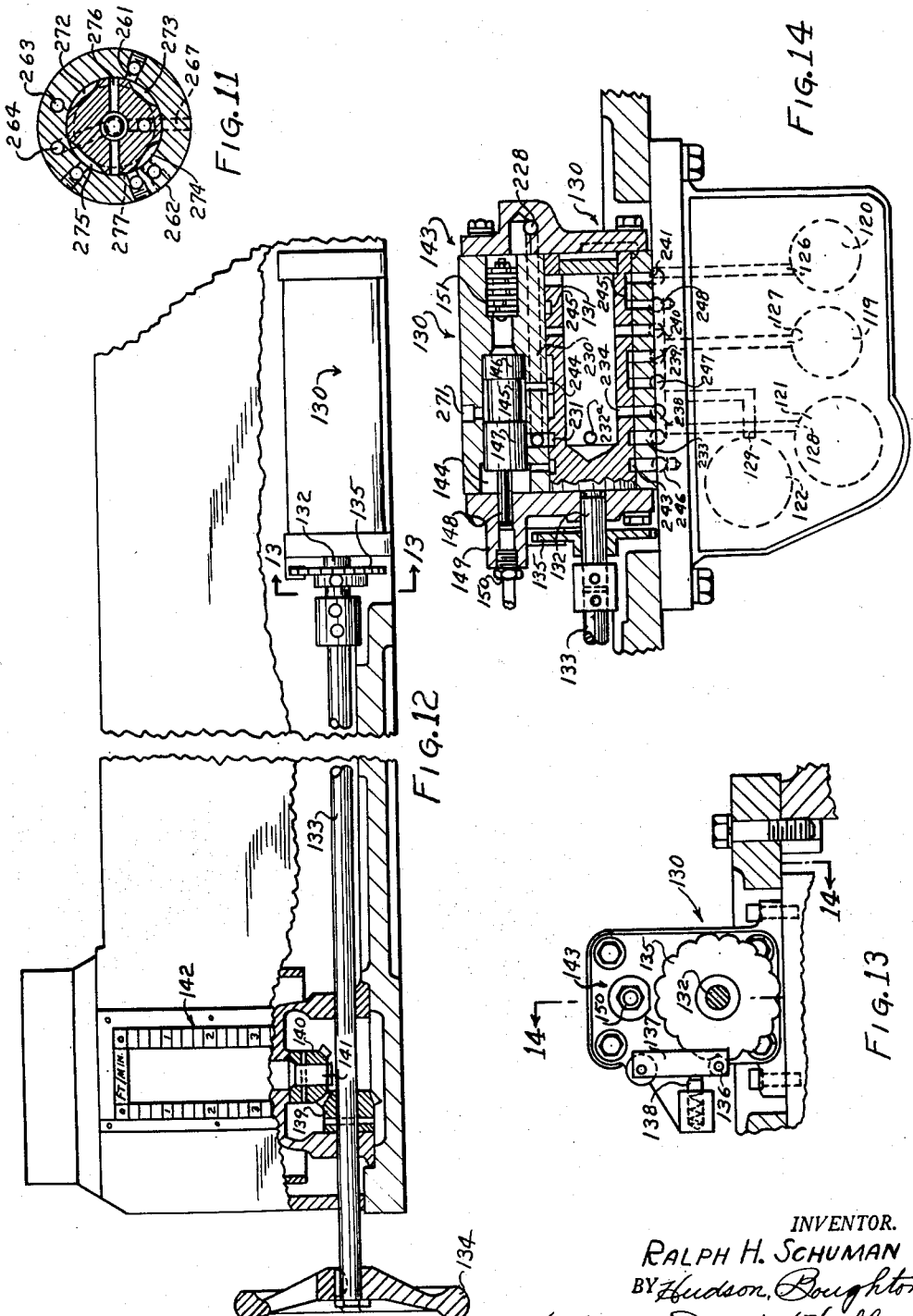

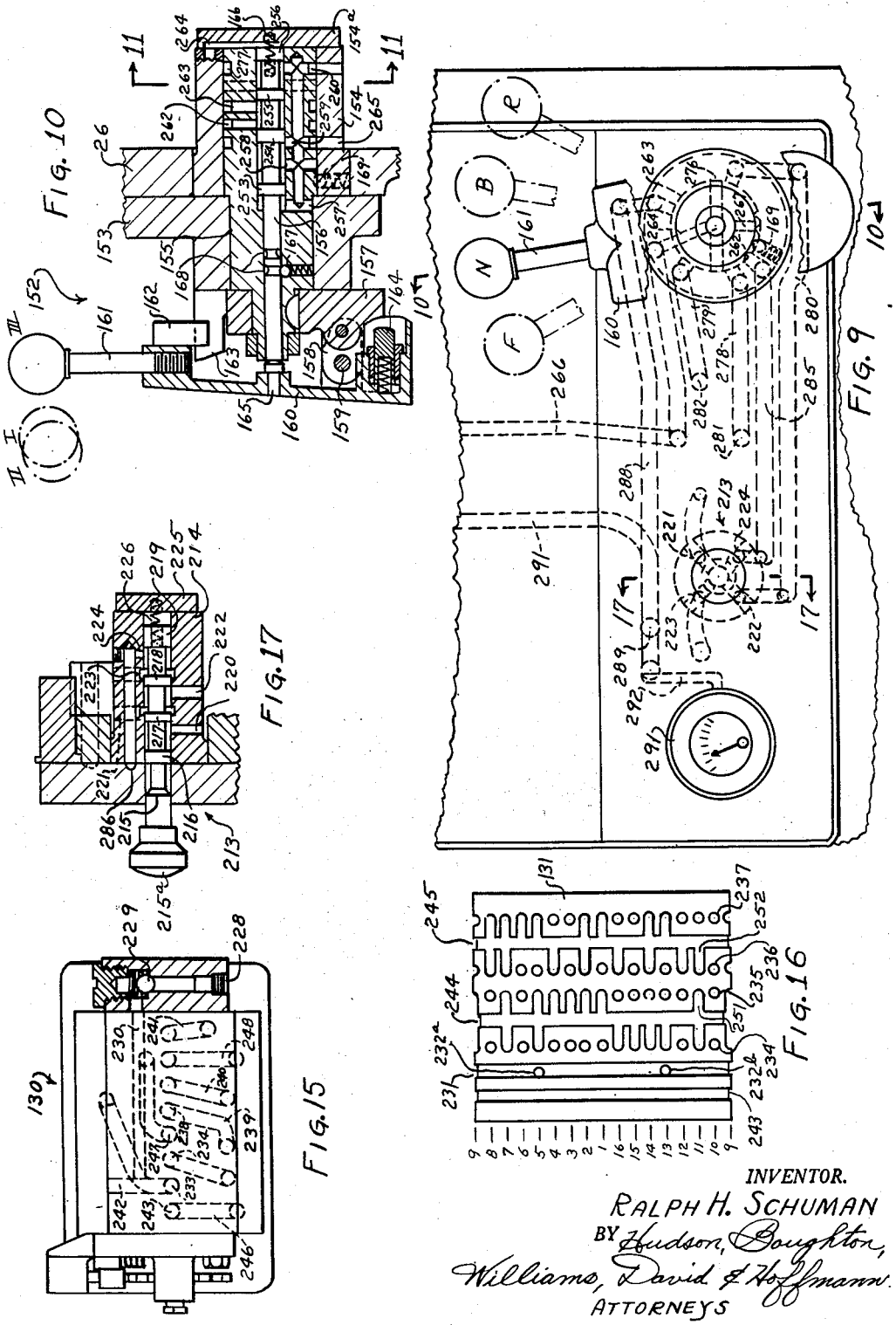

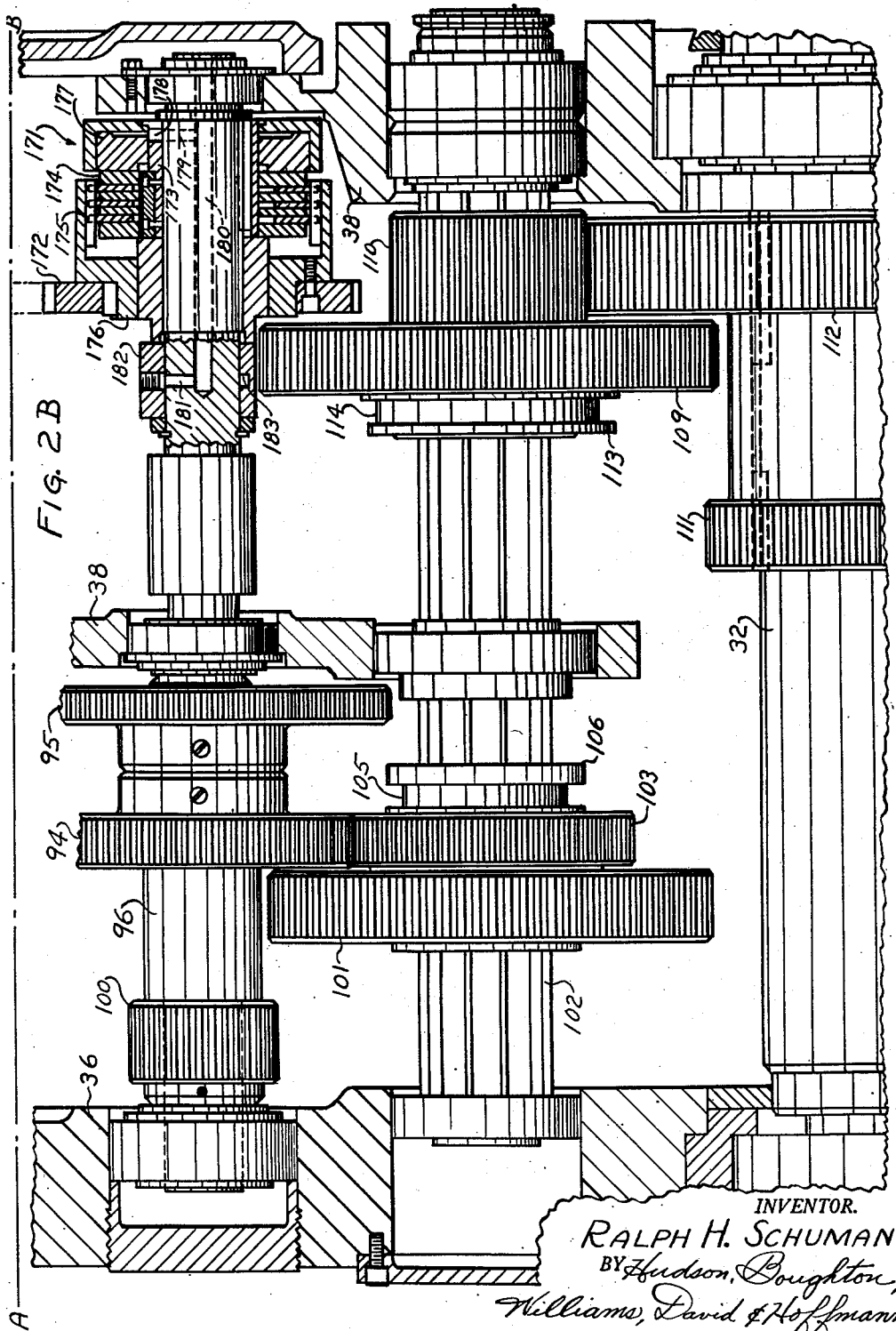

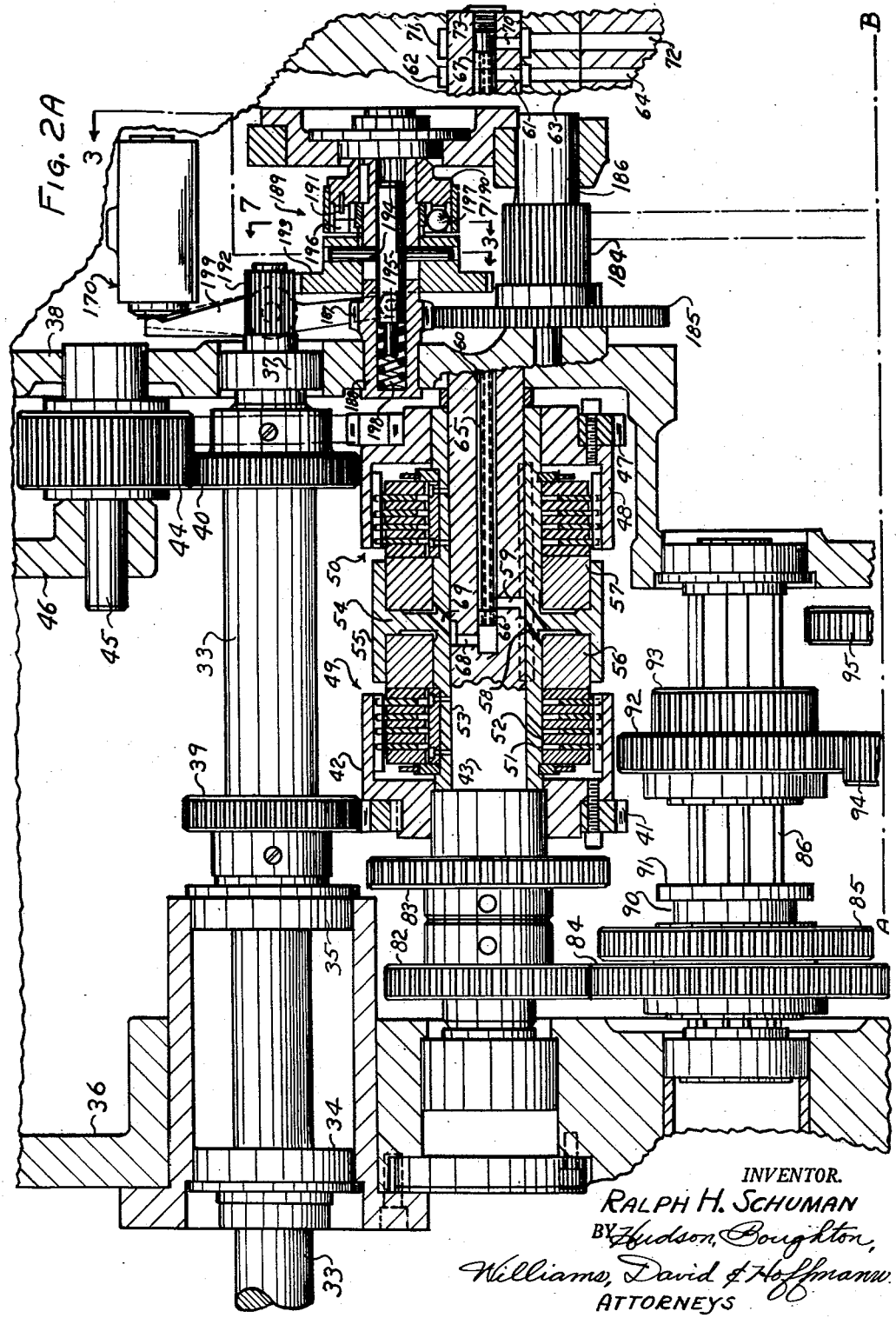

Patented Mar. 2, 1954

2,670,632

UNITED STATES PATENT OFFICE 2,670,632

MACHINE TOOL TRANSMISSION AND CONTROL THEREFOR

Ralph H. Schuman, Cleveland, Ohio, assignor to The Warner & Swasey Company, Cleveland, Ohio, a corporation of Ohio Application October 16, 1951, Serial No. 251,549

27 Claims. (Cl. 74—335)

This invention relates to a machine tool, and more particularly, to an improved mechanism for controlling the speeds, direction of rotation and the starting and stopping of a movable part, for example, the work spindle of a machine tool.

A machine tool provided with a change speed transmission for a moving part thereof and having a means for preselecting the direction and speed of movement of that part for each different operative step of a work cycle, which preselected movement is thereafter initiated by action of a single lever, is disclosed and claimed in United States Letters Patent No. 2,501,286, issued March 21, 1950 to C. M. Mirossay. The principal object of this invention is to provide a machine tool with a transmission and control therefor of the general type disclosed in that patent and with a means responsive to a predetermined torque differential between the input and output shafts of the transmission to automatically control the shifting thereof for providing the preselected speed and direction of movement of the movable part for a given step of a work cycle, whereby wear and tear on the gears is reduced by preventing clashing thereof and the efficiency of the machine tool is improved by enabling the shifting of the gears to always occur at the earliest proper time thereby reducing the time lost in making such shifts so that the productive capacity of the machine is improved.

Another obejct of the invention is to provide an improved machine tool having a geared change speed transmission with an improved means to control the shifting of the gears thereof such that a desired speed and direction of movement for a moving part during the next operation of a work cycle can be preselected while the part is engaged in the prior operation, shifting to the preselected speed and direction of movement being prevented until the torques of the input and outrut of the transmission are in proper relationship.

A more specific object of the invention is to provide an improved machine tool and transmission therefor of the type mentioned above and in which speed changes are effected by fluid pressure operated gear shifting means with a valve means controlled by the torque differential between the input and output of the transmission to permit gear shifting only when the said torque differential is at a predetermined value.

An additional object of the invention is to provide an improved machine tool and transmission therefor as defined above and in which a desired direction and rate of movement of a movable part of the machine tool may be preselected while the said part is moving at a different rate and/or in a different direction and shifting to the preselected rate and direction of movement is initiated by imparting a crawl or non-working speed to the output of the transmission, the shifting being automatically effected when the input and output of the transmission have attained the proper torque relationship.

A still further object of the invention is to provide in a machine tool means for automatically shifting the shiftable elements of a change speed transmission thereof once the shifting cycle has been manually initiated, the mechanism being such that the completion of the shifting cycle is automatically attained independently of any effort or attention on the part of the operator and only when the torque of said output shaft is in predetermined relationship to the torque of the input shaft so that shifting is effected without clashing or damage to the shiftable elements.

The invention further resides in novel features of the construction and in the combination and arrangement of the parts of the apparatus, and further objects and advantages of the invention will be apparent to those skilled in the art to which it pertains from the following description of the present preferred embodiment thereof which is described with reference to the accompanying drawings, having identical parts in the several views designated by the same reference characters, and in which:

Fig. 1 is a front elevational view of a turret lathe embodying the invention;

Figs. 2A and 2B, when joined along the broken line A—B, comprise a developed view of the novel change speed transmission in the headstock and which forms the drive to the work spindle of the lathe shown in Fig. 1, certain parts being broken away and others shown in section to more clearly illustrate the invention;

Fig. 3 is a view, partly in section and partly in end elevation, of a torque responsive member and associated valve, the view being taken substantially on the line 3—3 of Fig. 2A and looking in the direction of the arrows;

Fig. 4 is an enlarged sectional view taken substantially on the line 4—4 of Fig. 3 and looking in the direction of the arrows;

Fig. 5 is a sectional view taken substantially on the line 5—5 of Fig. 4 and looking in the direction of the arrows;

Fig. 6 is an enlarged, fragmentary view of a portion of Fig. 4 illustrating the manner in which a tortuous passageway is provided to effect a time delay by flow restriction;

Fig. 7 is a sectional view through the torque differential responsive means of this invention, the view being taken substantially on the line 7—7 of Fig. 2A as seen when looking in the direction indicated by the arrows;

Fig. 8 is a fragmentary elevational view of a portion of the torque differential means of Fig. 7, illustrating the cam surfaces thereof;

Fig. 9 is a fragmentary elevational view, to an enlarged scale, of a portion of the headstock of the turret lathe shown in Fig. 1 and illustrating the main control lever and valve controlled thereby;

Fig. 10 is a sectional view taken substantially on line 10—10 of Fig. 9, looking in the direction of the arrows, and shows, in full lines, the main control lever and its valve in the position for initiating a gear shift;

Fig. 11 is a sectional view taken substantially on the line 11—11 of Fig. 10 and looking in the direction of the arrows;

Fig. 12 is a detached view of a portion of the headstock, the view being principally in end elevation but with parts broken away and others in section, to show the preselector valve and its actuator;

Fig. 13 is a fragmentary sectional view taken substantially on the line 13—13 of Fig. 12 and viewed in the direction indicated by the arrows;

Fig. 14 is a sectional view through the preselector valve with a portion of the supporting member therefor shown in elevation, the section being taken substantially on the line 14—14 of Fig. 13 and viewed in the direction indicated by the arrows;

Fig. 15 is a detached plan view of the preselector valve shown in Figs. 12, 13 and 14 with a portion of the housing broken away to show a check valve therein;

Fig. 16 is a developed view of the periphery of the preselector valve shown in Figs. 12 to 15 illustrating the interconnections of certain passages therein;

Fig. 17 is a fragmentary sectional view through the inching valve of the apparatus, the view being taken substantially on the line 17—17 of Fig. 9 and viewed in the direction indicated by the arrows;

Fig. 18 is a somewhat schematic view of the fluid pressure circuit in the headstock of the machine with the inching valve shown in both elevation and section to more clearly illustrate the fluid passageways; and Fig. 19 is a view similar to Fig. 10, but to a smaller scale and showing the main control valve in its intermediate or normal position corresponding to the position thereof in Fig. 18.

The invention is here illustrated as embodied in a turret lathe which, as shown in Fig. 1, comprises a bed 25 having a headstock 26 at one end thereof. Slidable upon the bed are the usual turret saddle 27, with its slide 28 and turret 29, and a cross slide carriage 30 provided with cross slide 31. These portions of the lathe are conventional and hence need not be described in detail.

The headstock 26 of the lathe has a work spindle 32 journalled therein, see Fig. 2B, for rotation in either direction at a plurality of different speeds. For this purpose, the headstock is provided with a change speed transmission comprising an input shaft 33, Fig. 2A, which is driven from a power source, not shown. This shaft is selectively connectible with the spindle 32 by means of a plurality of clutches and shiftable elements of the transmission, the shiftable elements carrying gears which selectively intermesh to provide the different speeds of the spindle. The shifting of the gears, operation of the clutches, and operation of a brake of the transmission are all effected by fluid pressure operated actuators as will hereinafter become apparent.

The input shaft 33 of the transmission is journalled by means of suitable bearings 34 and 35 in a wall 36 of the headstock 26 and by a bearing 37 in an inner wall or web 38 of the headstock. Intermediate the bearings 35 and 37, the shaft 33 has gears 39 and 40 secured thereto in spaced relationship. The gear 39 is continuously in mesh with a gear 41 which is connected to a clutch member 42 rotatably supported upon a countershaft 43 that is suitably rotatably journalled in the walls 36 and 38. The gear 40 is continuously in mesh with a gear 44 rotatably supported on a jack shaft 45 mounted in the wall 38 and a bracket or wall 46. The gear 44 has a relatively wide face and is also in continuous mesh with a gear 47 secured to a clutch member 48 rotatably mounted upon the shaft 43.

The clutch member 42 is part of a main forward clutch, generally designated 49, which is adapted to control rotation of the spindle 32 in the forward direction at any of its speeds. The clutch member 48 is a portion of the main reverse clutch, generally designated 50, and which is adapted to connect the input shaft 33 through the transmission to the spindle 32 for rotation of the latter in the reverse direction at any selected speed. The clutches 49 and 50 are of the friction plate type and are actuated, as hereinafter described, to selectively connect either the member 42 or the member 48 with the shaft 43. Thus, the clutch 49 has a plurality of spaced annular frictional members 51 keyed for rotation with the member 42 and fitting between annular members 52 which are keyed for rotation with a sleeve 53 that is in turn keyed with the shaft 43. Likewise, the clutch 50 comprises similar sets of annular members cooperating respectively with the clutch member 48 and the sleeve member 53. The construction is such that when an axial thrust is exerted on the annular friction members, such as 51 and 52, they are forced into frictional engagement so as to clutch the corresponding gear 41 or 47 with the shaft 43 and thereby rotate the latter in either the forward or reverse direction depending upon whether it is clutch 49 or clutch 50 which is operated.

The clutches 49 and 50 are adapted to be fluid pressure actuated and for this purpose the sleeve member 53 has a radial flange portion 54 intermediate its ends and an outer axially extending wall 55 providing two annular cylinders one each on either side of the radial wall 54, see Fig. 2A. Within one of these annular cylinders is slidably disposed an annular piston 56 which is adapted to engage and exert an axial thrust on the friction members of the forward clutch 49. The other annular cylinder or chamber has an annular piston 57 slidable therein and adapted to exert an axial thrust on the friction members of the clutch 50. Fluid under pressure is selectively supplied behind the pistons 56 and 57 under control of the mechanism as hereinafter described. For the present it is sufficient to note that the space between the piston 56 and the wall 54 communicates through a passageway 58 in the sleeve 53, and a radial passageway 59 in the shaft 43 with a bore 60 extending axially through the shaft 43. The bore 60 is connected by a radial bore 61 adjacent the right-hand end thereof as viewed in Fig. 2A, with an annular groove or chamber 62 in the bushing or bearing 63, the groove 62 in turn communicating with a passageway 64 extending from the bushing and connected by means of a pipe or conduit to the main control valve, as hereinafter described.

A hollow pipe or tube 65 is provided within the bore 60 of the shaft 43 and this pipe or tube 65 has fluid-tight packings or collars 66 and 67 adjacent either end thereof to prevent passage of fluid thereabout. The collar 66 is intermediate the radial passageway 59 in the shaft 43 and an adjacent radial passageway 68, the latter being in communication with the region at the rear of the piston 57 through a passageway 69 in the sleeve 53. The collar 67 is intermediate the radial passageway 61 and a similar radial passageway 70 in the shaft 43, which passageway 70 communicates, through an annular groove or chamber 71 and a passageway such as 72, with a pipe or conduit for fluid under pressure and controlled as hereinafter described. The outer end of the bore 60 in the shaft 43 is closed by a plug 73.

It will be apparent from the construction just described that, when fluid under pressure is supplied to the passageway 64, this pressured fluid will act through the passageway 61, groove 62, bore 60 and passageways 59 and 58 to move the piston 56 to the left as viewed in Fig. 2A, thus effecting engagement of the friction members of the clutch 49. This fluid pressure cannot act upon the piston 57 since it is blocked by the collars 66 and 67. When, however, fluid under pressure is supplied to the passageway 72, this pressured fluid is effective through the passageway 70 and groove 71, the interior of the pipe 65, and the passageways 68 and 69 to force the piston 57 to the right as viewed in Fig. 2A thus effecting engagement of the friction members of the clutch 50.

In addition to the two clutches carried by the shaft 43 the latter is also provided with a fluid pressure operated brake, generally designated 73, see Fig. 18. This brake is constructed similar to the clutches 49 and 50 in that it comprises spaced annular friction members 74 which are, however, held from rotation by being keyed to a bushing or housing 75 for the end of the shaft 43. Annular members 76 are interposed between the members 74 and are connected for rotation with the shaft 43 by means of a sleeve 77 connected with the latter. Braking action upon the shaft 43 is effected by exerting an axial thrust on the annular members 74 and 76 by means of an annular flange 78 provided on a piston 79 slidably supported in a cylinder 80 which is in axial alignment with the end of the shaft 43, see Fig. 18. Fluid under pressure is conducted to the cylinder 80 at a point behind the piston 79, by means of suitable pipes or conduits connected to a passageway 81 in the wall of the cylinder 80.

Adjacent the clutch 49, the shaft 43 has gears 82 and 83 secured thereto for rotation therewith. The gear 82 is of smaller diameter than the gear 83 and these gears are adapted to respectively cooperate with gears 84 and 85 which are connected for rotation together and for axial sliding movement on a countershaft 86 by virtue of a splined connection therebetween. As shown in Fig. 2A, the gear 82 is in mesh with the gear 84 to thereby effect rotation of the shaft 86 when either the clutch 49 or 50 is engaged thereby providing one speed relationship of the shafts 43 and 86 in either direction of rotation. A second speed relationship between the shafts 43 and 86 is provided by axially shifting gears 84 and 85 to the right as viewed in Fig. 2A thus disengaging the gear 84 from the gear 82 and meshing the gear 85 with the gear 83. This sliding of the gears 84 and 85 is effected by means of a shiftable member or element 87, see Fig. 18, which is connected by a piston rod 88 to a piston 89 adapted to be moved by fluid under pressure as hereinafter described. The member 87 engages in an annular groove 90 in the common mounting member 91 for the gears 84 and 85.

It will be apparent therefore, that when fluid under pressure is applied at one side of the piston 89 the latter will move to the position shown in Fig. 18, thus engaging gears 82 and 84. When fluid under pressure is applied at the other side of the piston 89, however, the latter shifts to the right, as viewed in the drawings, thus causing the shiftable member or element 87 to move the gears 84 and 85 from their position as shown in Fig. 2A so that the gear 85 is now engaged with the gear 83 and the gears 82 and 84 are disengaged.

Also slidably splined to the shaft 86 is a pair of integral gears 92 and 93 which are adapted to respectively mesh with gears 94 and 95 connected to a countershaft 96 which is journalled in the walls 36 and 38 of the headstock, see Fig. 2B. The gears 92 and 93 may be shifted from their positions as shown in Fig. 2A to effect meshing of gear 93 with gear 95 by means of a shiftable element or member 97, see Fig. 18, which has a portion straddling a part of the periphery of the gear 92 to effect axial movement of the gears 92 and 93, the member 97 being connected by a piston rod 98 with a piston 99 in a cylinder to which fluid under pressure may be supplied at either side of the piston as will be hereinafter readily apparent.

It will be evident therefore that for each position of the gears 84 and 85, the shaft 96 can have either of two different speeds in either direction, depending upon the position of gears 92 and 93 and which of the clutches 49 and 50 is energized. There are, therefore, provided four different speeds of the shaft 96 with respect to the speed of the input shaft 33.

In addition to the gears 94 and 95, shaft 96 is also provided with a gear 100 which is connected with the shaft 96 for rotation therewith and is adapted to be selectively engaged or disengaged by a gear 101 which is slidably splined on a countershaft 102. The gear 101 is connected to, or integral with, a smaller diameter gear 103 which is also splined to the shaft 102 and adapted to selectively mesh with the gear 94. The gears 101 and 103 are moved axially of the shaft 102 to effect the above-mentioned selective engagement of the gears 100, 101 or gears 94, 103 by means of a suitable shiftable element or member 104 which has a portion engaged in an annular groove or recess 105 of an attached or integral boss 106 for the gears 101 and 103. The member 104 is connected by a piston rod 107 to a piston 108 in a cylinder adapted to receive fluid under pressure at either side of the piston for shifting of the gears 101 and 103.

It will be apparent, therefore, that for each speed of the shaft 96, there are two speeds of the shaft 102 in either direction and hence there are eight speeds of the shaft 102 for a given speed of the input shaft 33 or of the intermediate shaft 43.

The shaft 102 also has a second pair of gears 109 and 110 splined thereon which gears are either integral or connected for rotation together and for sliding movement on the shaft 102, the gear 109 being larger than the gear 110. The gear 109 is adapted to mesh with a gear 111 connected with the spindle 32 while the gear 110 is adapted to mesh with the gear 112 also connected with spindle 32. It will be evident, therefore, that there are two possible speeds of the spindle 32 for each speed of the shaft 102 and hence there are sixteen speeds of the spindle 32 for each speed of the input shaft 33 or of the intermediate shaft 43 in either direction of rotation of the shaft 43.

In order to effect the aforementioned shifting of the gears 109, 110, the latter are provided with a boss 113 having an annular groove or recess 114 in which is engaged a suitable shiftable element or member 115 connected by a piston rod 116 with piston 117. The piston 117 is, like the pistons 89, 99 and 108, adapted to be moved in either direction by the application of fluid under pressure to either side thereof.

The gear shifting rods 88, 98, 107 and 116 are slidably guided within a bracket or wall 118 provided in the headstock and the pistons 89, 99, 108 and 117, respectively, are received in cylinders 119, 120, 121, 122, also provided in the headstock. The portions of the cylinders to the left of the pistons, as viewed in Fig. 18, are interconnected by passageways 123, 124 and 125 while fluid may be admitted on the other side of the pistons through the passageways 126, 127, 128 and 129, thereby controlling the selective shifting of the gears of the transmission.

The operation of the gear shifting fluid pressure motors, comprising the aforementioned pistons 89, 99, 108, 117 and cylinders 119, 120, 121, 122 is selected by a speed selector valve, generally designated 130, which is mounted in the headstock and comprises a valve housing in which the valve body 131 is rotatably mounted, see Figs. 12, 14 and 18. The valve body 131 is provided with a plurality of passageways for selectively interconnecting the several ports of the valve housing in accordance with the rotative position of the valve. In order to effect the desired rotation of the valve, the valve body 131 is coupled to a shaft 132 which extends outwardly of the valve housing and is in turn coupled with a shaft 133 rotatably supported in the upper part of the headstock 26 and extending beyond the front thereof where it is provided with a hand wheel 134, see Figs. 1 and 12.

In order to exactly locate the valve body 131 in each of its different positions and to retain the valve body in any such position against accidental displacement, the shaft 133 has a disk 135 fixed thereto which disk has its periphery provided with sixteen recesses or serrations each corresponding to one of the sixteen possible speeds of the spindle. Cooperating with the disk 135 is a roller 136 carried at the lower end of the pivoted arm 137 which is urged towards the circumference of the disk 135 by a spring pressed plunger 138, see Fig. 13. It will thus be seen that the roller 136, arm 137 and plunger 138 cooperate with the disk 135 to provide a spring detent means for retaining the selector valve 130 in a selected position. The detent does not, however, prevent turning of the valve by the hand wheel 134 when a different speed of the spindle is to be selected as hereinafter described.

The shaft 133 of the selector valve also has a bevel gear 139 fixed thereto which meshes with a bevel gear 140 fixed to the lower end of an indicator shaft 141 carried by the headstock. The shaft 141 carries a suitable drum or other indicator 147 movable relative to calibrations on the headstock for showing the cutting speeds in feet per minute for various types of work, thus enabling the operator to select the proper position of the valve 130 and hence select the proper speed of the spindle by simply turning the hand wheel 134 until the indicator 142 is at the calibration indicative of the work to be performed. The details of this indicating means do not form a part of this invention and hence will not be further described.

Supported adjacent the selector valve 130 is an interlock time delay valve, generally designated 143. In the illustrated embodiment, the time delay valve 143 is provided in the same housing as the selector valve 130, thereby facilitating assembly and maintenance of the parts. The time delay valve 143 comprises a valve chamber 144 in which is slidably mounted a valve body 145 having a pair of spaced lands 146 and 147. The valve body 145 at one end thereof has a reduced diameter extension 148 slidably received in a bore provided in the adjacent end wall 149 of the valve chamber, this bore being connected with a conduit 150 for a purpose hereinafter described. The other end of the valve chamber 144 is provided with a fluid flow restricting unit 151, which unit comprises a series of baffle disks with peripheral notches and projections on alternate disks and staggered with respect to each other thereby providing a tortuous path therethrough for the pressure fluid so that a predetermined interval of time is required for the fluid to flow through the unit 151 and into the portion of the valve chamber adjacent the land 146. The details of a time delay device of this nature are fully disclosed in the aforementioned patent to Mirossay 2,501,286, and hence are not here repeated.

The main control valve means for the apparatus, generally designated 152, is carried by a plate 153, bolted or otherwise secured to the front of the headstock 26, see Figs. 10 and 19. The housing 154 of this main control valve extends rearwardly through an opening in the front wall of the headstock 26, and is provided with a valve chamber in which a valve body 155 is rockably mounted. The valve body 155 is, in turn, provided with a valve chamber in which a gear shifting cycle control valve body 156 is slidable. The rockable valve body 155 has a reduced diameter hub-like portion extending outwardly of the valve housing and plate 153 and is rotatably supported in the latter. The slidable cycle valve body 156 has an elongated extension passing through the hub portion of the valve body 155 and is adapted to extend outwardly slightly beyond the hub portion, see Fig. 19.

A handle bracket 157 is keyed to the outer end of the hub portion of the valve body 155 and this bracket has two spaced outwardly extending lugs or ears 158 which support a transversely extending rod 159 on which a handle body 160 is rockably supported. The handle body 160 has a handle 161 at its upper end for manipulation of the body 160 and the valve bodies 155 and 156 as hereinafter described. The handle body 160 also carries a stop member or plate 162 which has two spaced downwardly extending lugs disposed on either side of a forwardly projecting stop member or lug 163 which is bolted or otherwise secured to the plate 153, thus defining the maximum rocking movement in opposite directions of the handle body 160 when the latter is in either its "Clutches Locked" or "Gear Shifting" positions designated I and III, respectively, in Fig. 19. The proportions of the stop members 162 and 163 are such, however, that when the handle 161 and the handle body member 160 are rocked outwardly, that is, counterclockwise as viewed in the drawings, to its maximum position, designated II or "Free to Shift" in Fig. 19, the stop member 162 will clear the stop member 163 and permit rotation of the handle 161 and the valve body 155.

The handle body 160 is provided below the rod 159 with a spring pressed plunger 164 which cooperates with the lower end of the handle bracket 157, see Figs. 10 and 19 to normally maintain the handle in the position designated I and which corresponds to the "Clutches Locked" position. When the handle is rocked inwardly, to the position III, and which is the position of the handle shown in solid lines in Fig. 10, the plunger 164 is out of contact with the handle bracket 157 and the handle is retained in this position by a spring detent until automatically returned to position I as hereinafter explained. When the handle is rocked to position II, that is, to its outermost position as shown in Fig. 19, the plunger 164 is depressed and functions when the handle is released to restore the latter to position I.

The handle body 160 is provided, above the pivot rod 159, with an abutment 165 which may be formed integral on the body or as a separate pin. This abutment is aligned with the extension of the shiftable cycle control valve body 156 and acts when the handle 161 is moved to position III to move the slidable valve body 156 inwardly. As will be hereinafter described, fluid pressure acts on the inner end of the slidable valve body 156 at the end of a gear shifting cycle to move the said body outwardly, thus automatically restoring the handle 161 from position III to its normal position I. This outward movement of the slide valve body is assisted by a spring 166 acting thereon, the slide valve being retained against accidental displacement while in either of its two positions by a spring detent 167 cooperating with spaced grooves or recesses 168 on the valve body 156.

As noted above, the cooperating stops 162 and 163 provide for only limited rocking movement of the handle 160, 161 when they are in either position I or position III. This extent of rocking movement is sufficient to move the handle only between neutral and brake positions which are designated in Figs. 9 and 18 as "N" and "B," respectively. The handle 161 cannot be rocked to either the position marked "F" or that marked "R," and which correspond respectively with forward and reverse rotation of the spindle, when the handle is in either the I or III positions. However, the handle 161 may be rocked outwardly to the II position, against the force of the spring plunger 164, thus disengaging the stops 162 and 163 so that the handle may then be rocked to either the forward or reverse positions, "F" or "R," respectively. When the handle is released the plunger 164 will return it from position II to position I, where the stop members 162 and 163 will again prevent rocking movement of the handle until it is again moved outwardly to the position II. Suitable means may be provided to assist in determining each of the four rotative positions, "F," "N," "B" and "R," of the handle 161 and to retain the latter against accidental displacement therefrom. As illustrated in Fig. 9 of the drawings, this means comprises a spring detent 169 which cooperates sequentially with spaced notches or recesses on the valve body 155 to properly position and retain the latter and the handle 161 in a selected rotative position. If desired, positive stops may also be provided to limit the maximum rocking movement of the valve handle 161 as is disclosed in the aforementioned Patent 2,501,286.

In accordance with this invention, a desired speed of the work spindle 32 is selected by positioning the selector valve 130 and the necessary shifting of the gears to provide the selected speed is initiated by actuation of the main control valve means 152 through rocking the latter inwardly to its position III. However, the actual shifting of the gears cannot occur until the torques of the input shaft 33 and the output shaft, such as shaft 102 or the spindle 32, are in proper relationship to prevent undue strains on the mechanism or clashing of the gears. This control of the gear shifting is effected by a torque responsive governing valve 170 operating in response to the torque differential between the input and output of the transmission to control the application of pressured fluid to the gear shifting fluid motors.

As shown in Fig. 2B, the illustrated embodiment of the invention has the shaft 96 extended beyond the gears 94 and 95 and this extended portion is provided with a fluid pressure operated clutch 171 for selectively connecting a gear 172 to the shaft 96 for rotation therewith. The clutch 171 comprises a sleeve 173 which is keyed to the shaft 96 and has a plurality of spaced friction members 174 keyed thereto. Alternating with the friction members 174 are spaced friction members 175 keyed to an annular clutch member 176, journalled on the sleeve 173. The gear 172 is connected to the clutch member 176 for rotation therewith and hence the gear 172 is operatively connected to shaft 96 when the latter is clutched to the member 176 through operation of the friction members 174 and 175. The friction members are thus moved into operative relationship by means of an annular piston 177 slidable in an annular cylinder surrounding the sleeve 173. The rear face of piston 177 is recessed to provide for admission of pressured fluid therebehind through passageway 178 in sleeve 173 which communicates with passageways 179, 180 and 181 in the shaft 96. The pressured fluid is conducted to the passageways in shaft 96 by suitable conduits, as hereinafter described, connected with a stationary sleeve member 182 which surrounds the shaft 96 and has an annular passageway 183 communicating with the passageway 181 in the shaft.

The gear 172 is in continuous mesh with a gear 184 which is integral with or connected to a gear 185 provided on a countershaft 186. The gear 185 is in continuous mesh with a gear 187 formed integrally on a tubular member 188 of a torque responsive mechanism, generally designated 189. Keyed to one end of the member 188 is a first camming member 190 of the torque responsive mechanism, which member has a plurality of cam surfaces 191 on a radial face thereof. The member 190 is therefore driven from the shaft 96 when clutch 171 is engaged and, since shaft 96 is geared with shaft 102 and spindle 32, the torque exerted on member 190 is directly related to the torque of the output of the transmission.

The shaft 33 is extended beyond the gear 40 and the bearing 37 and this extended portion of the shaft has a small diameter gear 192 fixed thereto or integral therewith. The gear 192 is in continuous mesh with a larger diameter gear 193 which is slidingly supported on the tubular member 188 of the torque responsive mechanism 189, the gear 193 being connected by a pin 194 with a rod 195 slidable in the hollow bore of the member 188. The radial face of the hub of the gear 193, on the side adjacent the camming member 190, is provided with camming surfaces 196 between which and the surfaces 191 are provided spaced steel balls 197. The rod 195 is freely slidable within the member 188 but is limited in this sliding movement by the axial length of the slot in the member 188 through which the pin 194 extends. Therefore, the gear 193 and the camming surfaces 191 are directly responsive to the torque of the input shaft 33.

A spring 198 acts upon the rod 195 and normally urges the latter and the attached camming surfaces 196 on gear 193 in a direction for providing a driving relationship with the surfaces 191 through the balls 197. The force of this spring is such, however, that when the torque differential between the two camming members of the torque mechanism 189, which, as explained above, is representative of the torque differential between the input and output shafts, exceeds a predetermined value, the camming surfaces 191 and 196 tend to move circumferentially with respect to each other thus moving the rod 195 and the gear 193 axially against the force of the spring 198 and to the left as shown in Fig. 2A. Adjacent the rear face of the gear 193, that is at the left thereof as viewed in Fig. 2A, is mounted a lever 199 which is pivoted intermediate its ends and has one arm bearing against the gear 193 while the other arm is provided with an abutment portion adapted to engage the end of a valve body 200 of the governor valve 170.

It will be evident from the construction just described that, when the clutches 49 and 50 are disengaged and clutch 171 is engaged, the shaft 33 then drives the spindle 32 through gears 192, 193, the torque responsive mechanism 189, gears 187, 185, 184, 172, clutch 171, gears 94 and 103 or gears 100 and 101, and gears 109 and 111 or gears 110 and 112. This imparts a non-working or crawl speed to the spindle at which speed gear shifting of the transmission is effected. Shifting of the gears cannot, however, occur until the torque differential between the input and output shafts of the transmission is equal to or less than a predetermined value when the spindle is driven at the said non-working speed. This is achieved by virtue of the fact that when the said torque differential is excessive the gear 193 moves axially of member 188, thus rocking the lever 199 so that the latter engages the valve body 200 of the governor valve preventing shifting of the latter to the position in which fluid under pressure is supplied to the gear shifting fluid motors, as hereinafter described in detail. However, when the torque differential between the input and output shafts of the transmission has attained the said predetermined value, there is no longer a circumferential displacement between the two camming members of the torque responsive mechanism so that the force of the spring 198 is sufficient to again urge the gear 193 to its initial position as shown in full lines in Fig. 2A so that the lever 199 no longer prevents movement of the valve body 200 of the governor valve 170 and shifting of the gears may then occur.

Referring now to Figs. 4, 5 and 6, it will be seen that the governor valve 170 has the valve body 200 slidably supported therein and that this valve body has a pair of spaced lands 201 and 202 located on either side of a radial opening 203 in the body which communicates with an axially extending bore 204 therethrough. The right-hand end of the valve body, as viewed in Fig. 4, is closed by a sleeve-like plug member 205, the hollow interior of which is provided with a flow restricting member 206. This flow restricting member 206 may be formed in substantially the same manner as the flow restricting member 151 previously described. However, in the illustrated construction this member is provided by threading it and the bore of the member 205 and then removing a portion of one of the threads to thus provide a tortuous passageway between the members.

Pressured fluid is adapted to enter the valve 170 through a port 207 which communicates through a passageway 208 and an opening 209 in the plug member 205 with the region at one side of the flow restricting member 206 so that the fluid under pressure is only gradually applied to the bore 204 of the valve body 200. The length and size of the tortuous passageway through the flow restricting member 206 are so chosen that there is a predetermined time delay between the instant when the pressured fluid is applied to the port 207 and the time when the valve body 200 is moved thereby against the force of the compression spring 210 to its outwardmost position as represented in full lines in Fig. 2A. This movement of the valve body 200 causes the land 202 to uncover an opening in the wall of the valve in communication with the port 207 so that the pressured fluid may then by-pass the flow restrictor 206 and now flow through the bore 204 and the opening 203 to a port 211, see Fig. 4, thus allowing fluid under pressure to be supplied to the selector valve as hereinafter described in detail. When, however, the application of fluid pressure to the port 207 is terminated, or the lever 199 is rocked as previously described, due to torque differential in excess of that permissible for clutch shifting, the valve body 200 is moved to the right to the position shown in Figs. 4 and 5. This is also the position of the valve when the machine is idle and no pressure is applied to the port 207, the valve body being retained in this position by the spring 210. A drain for the portion of the valve chamber containing the spring 210 is provided through a port 212.

In addition to the previously described operating valves of the mechanism, an inching valve is also provided to permit a slow rotation or inching of the work spindle. This valve, which is generally designated 213, is mounted on the headstock 26 adjacent the control handle 161 and comprises a valve housing 214, see Fig. 17, in which a valve body 215 is slidably mounted with the outer end of the latter provided with a suitable knob 215a. The valve body 215 is provided with spaced lands 216, 217, 218 and 219 to control communication through the ports 220, 221, 222, 223 and 224 as hereinafter described. The inner end of the valve housing 214 is closed by a plate 225 between which and the adjacent end of the valve body 215 is a compression spring 226 normally urging the valve body 215 to its outermost position as shown in Fig. 17.

Referring now to Figs. 14, 15 and 18, it will be seen that pressured fluid from the port 211 of the governor valve 170 is applied through a suitable conduit or passageway 227 to a port 228 in the housing of the selector and interlocking valves 130 and 143. The inlet passageway in the valve housing connecting with this port 228 is controlled by a spring pressed check valve 229, see Fig. 15, which permits flow of fluid only in the direction into the interlock and selector valves. Beyond the check valve 229 the inlet passageway in the valve housing connects with the region in front of the flow restrictor 151 and with a passageway 230 extending through the valve housing and communicates with an annular groove 231 in the selector valve body 131. This groove 231 communicates with the hollow interior of the valve body 131 through spaced openings 232a and 232b, see Fig. 16. The groove 231 is also in communication with a passageway 233 in the valve body for a purpose hereinafter described. The interior of the valve body 131 also communicates with the exterior thereof through a plurality of spaced openings 234, 235, 236 and 237 arranged in axially spaced groups extending circumferentially above the periphery of the valve body 131, see Fig. 16. As shown therein, the holes or openings 234 are located at the 1st, 2nd, 3rd, 4th, 6th, 8th, 10th and 12th circumferential positions of the valve body. The openings 235 are located at the 6th, 8th, 10th, 12th, 13th, 14th, 15th and 16th circumferential positions of the valve body 131. The openings 236 are located in the 1st, 3rd, 5th, 6th, 9th, 10th, 13th and 15th circumferential positions of the valve body; and, the openings 236 are located at the 3rd, 4th, 9th, 10th, 11th, 12th, 15th and 16th circumferential positions of the valve body 131.

The openings 234 are adapted to be selectively placed in communication with a passageway 238 of the valve 130, see Figs. 14 and 15, while the openings 235, 236 and 237 are adapted to be placed in communication, respectively, with passageways 239, 240 and 241. The passageway 240 communicates with the port 127 in the cylinder 119 of the fluid motor for shifting the gears 84 and 85. The passageway 241 communicates with the port 126 of the cylinder 120 of the fluid motor for shifting gears 92 and 93. Passageway 238 communicates with the port 128 in the cylinder 121 in the fluid motor for shifting the gears 101 and 103 while the passageway 239 communicates with the port 129 in cylinder 117 of the fluid motor for shifting the gears 109 and 110. The ports 123, 124 and 125 on the opposite side of the pistons in these fluid motors all communicate with each other and with the port 242, see Fig. 18, in the cylinder 119 which in turn communicates with the aforementioned passageway 233 of the valve 130.

The valve body 131 of the selector valve 130 is also provided with spaced circumferentially extending grooves 243, 244 and 245. These grooves cooperate with passageways 246, 247 and 248 respectively which are all connected with the drain conduit 249 extending to a fluid reservoir 250, see Fig. 18. As will be seen in Fig. 16, the grooves 244 and 245 have axial extensions 251 and 252 at spaced circumferential positions of the valve to selectively communicate the passageways 238, 239, 240 and 241 with the drain 249 at the circumferential positions of the valve at which such axial extensions align with the last-mentioned passageways. Thus, in the first position of the selector valve, indicated by the numeral "1" at the left-hand side of Fig. 16; passageways 239 and 241 are connected with the drain thus providing for relief of the pressured fluid from the cylinders 117 and 120 through the ports 129 and 126 respectively. These same cylinders and ports are likewise connected to drain in the 2nd, 5th and 7th positions of the selector valve. Similarly, the passageway 239 and the associated cylinder 117 are connected to drain at the 3rd, 4th, 9th and 11th positions of the valve, while the passageway 241 and cylinder 120 communicating therewith are not then being drained. It will be similarly seen that the cylinder 120 is connected to drain through the passageway 241 and grooves 252 in the 6th, 8th, 13th and 14th positions of the valve as well as in the previously mentioned positions where both this cylinder and the cylinder 117 are so connected. Likewise, it will be seen that the cylinder 119 will be connected to drain through the passageway 240 and the groove 245 in the 2nd, 4th, 7th, 8th, 11th, 12th, 14th and 16th positions of the selector valve 131. Also, the cylinder 121 will be connected to drain through the passageway 238 and the groove 244 when the valve body 131 is in its 5th, 7th, 9th, 11th, 13th, 14th, 15th or 16th positions.

Referring now to Figs. 10 and 11, it will be seen that the previously mentioned slidable valve body 156 of the main control valve 152 has four spaced lands, 253, 254, 255 and 256, for controlling the passage of fluid through passageways 257, 258, 259, 260, 261, 262 and 263 in the valve body 155 as well as through the passageway 264 in the end cover plate 154a of the valve. The passageways 257, 258, 259 and 260 are connected with an axial bore, disposed at one side of the center of the valve body 155 and communicating with drain passages 265, which may be connected to drain conduit 249 or directly to the reservoir 250.

The passageway 264 is connected to a conduit 266, see Fig. 18, which extends to a passageway 267 through the bracket 118 in which the gear shifting members 88, 89, 107 and 116 are slidable. This passageway 267 is controlled by radially extending passages through the said gear shifting members, there being two such passageways 268, 269 in each member and corresponding to the two extreme positions of those members. Consequently, the passageway 267 through the bracket 118 can provide for unobstructed flow of fluid only when the said radial passageways 268 or 269 of the gear shifting members are aligned with the said passageway 267. As will hereinafter be apparent, this construction insures that one or the other of each pair of shifting gears will be in proper operative relationship in the transmission before the gear shifting operation is completed and hence will be hereinafter referred to as an interlock.

The passageway 267 is connected to a conduit 270 which extends to a port 271 of the time delay valve 143, see Fig. 14. As shown in that figure, the port 271 is normally in communication with the space between the lands 146 and 147, the said space in turn being in communication with the groove 244 of the selector valve 130 which groove, it will be remembered, communicates with the drain conduit 249.

Referring now to Figs. 9, 11 and 18, it will be seen that the rotative valve body 155, in addition to the aforementioned passages 257 to 263, has four circumferentially spaced axially extending recesses 272, 273, 274 and 275, and a diametrically extending passageway 276. The recesses or grooves 272, 273, 274 and 275 are interconnected by an annular groove 277 which communicates with the drain opening or passageway 265. The diametrical passage 276 is adapted to be placed selectively in communication with passageways 278, 279 and 280, the openings to which are all disposed in the same axial plane. The passageway 278 communicates through a conduit 281 with the passageway 64 of the cylinder or actuator for the forward clutch 49, and the passageway 279 communicates through a conduit 282 with the passageway 72 for the cylinder or actuator for the reverse clutch 50. The passageway 280 communicates with the port 222 of the inching valve 213, which port is in communication with the port 221 of that valve in the normal or non-operated position of the valve. The port 221 communicates with the port or passageway 81 for the brake actuator 71 through interconnected passageways or conduits 283 and 284.

The port or passageway 262 of the main control valve 152 communicates, through a passageway 285, with the port 224 of the inching valve 213. This port is normally in communication with the port 223 when the inching valve is in normal position, see Fig. 17, and the latter port communicates, through a passageway or conduit 286, with the passageway or port 181 of the crawl clutch 171. The passageway 285, which communicates with port 262 of the main valve 152, also is in communication with a conduit 287 which is connected with the port 207 of the governor valve 170 and, from the port 211 of the governor valve, the aforementioned conduit 227 extends to the inlet 228 of the preselector valve 130 and its associated delay valve 143. The inlet port 263 of the main valve 152 is connected by a conduit 288 with the supply conduit 289 and the latter is connected with the output of a pump 290, the input side of which is connected with the reservoir 250. The fluid pressure supply conduit 289 is also connected with the valve 143 through the aforementioned conduit 150. A pressure gauge 291 is also connected with the pressure supply conduit 289, through the passageway 288 and a passageway 292. This gauge is preferably located on the headstock 26 adjacent the main control valve handle 161 and the knob 215a for the inching valve 213.

For convenience in manufacturing, assembly and maintenance, a number of the aforementioned fluid passageways between the several valves are provided in the form of grooves or recesses in covering or housing plates rather than by separate pipes or conduits. Such grooves or passageways have been indicated at various places in the drawings, see for example Figs. 9, 14 and 17. However, for simplicity and clarity of disclosure, certain of the interconnections between the various valves have been diagrammatically represented in Fig. 18 as though they were conduits or pipes rather than such grooves or passageways. Moreover, the inching valve 213 has been shown in sectional view in Fig. 18 and also indicated in broken lines in front view in the same figure to facilitate an understanding of the connections thereto. Consequently, certain of the connections to this valve appear as separate pipes or conduits, whereas such connections are actually passageways or grooves in the cover plate for the headstock in which the inching valve is mounted. Therefore, where reference is made to passageways or conduits, it is to be understood that these terms are employed in their generic sense as representing a means for transmitting fluid and are intended to cover a construction in which the connections are effected through milled grooves or slots in parts of the frame or cover plates of the apparatus, through separate pipes, or through combinations of such grooves and pipes.

It will also be understood that in the schematic representation of the hydraulic circuit, certain of the drain conduits or passageways extending from various of the valves have been omitted for the sake of clarity. Likewise, various conventional features, such as relief valves for maintaining a predetermined pressure in the system, and other well-known expedients normally employed in an apparatus of this nature, have not been here illustrated.

The operation of the several valves and other fluid pressure actuated mechanisms will be best understood from a brief description of the manner in which the apparatus is utilized in operation of a machine tool to effect change of speed and/or stopping of the spindle. Let it be assumed that power is being supplied to the input shaft 33, that the gears of the transmission are positioned as shown in Figs. 2A and 2B, that the fluid pressure pump 290 is in operation, that a workpiece is mounted in the chuck on the work spindle 32, and that the handle 161 of the main control valve 152 is in positions I and N. Consequently, the passageways 278, 279 and 280 leading to the actuators for the forward clutch 49, the reverse clutch 50 and the brake 73 are all connected to drain through the grooves or recesses 274, 275 and 273, respectively, see Fig. 11, with the result that the spindle 32 is stationary. The selector valve 130 will be in its 9th position, since this is the setting corresponding with the positions of the gears illustrated in Figs. 2A and 2B. Also, the inching valve 213 and the governor valve 170 will be in their normal positions as indicated in Fig. 17, and Figs. 4 and 5, respectively.

Now let it be assumed that the next operation of the machine tool requires that the spindle 32 rotate in a forward direction and at the speed produced when the gear 82 meshes with gear 84, gear 92 meshes with gear 94, gear 100 meshes with gear 101 and gear 110 meshes with gear 112. This will require that the gears 101 and 103 be shifted from the position shown in Fig. 2B to the other position thereof with the other gears remaining at their illustrated positions. The new positions of the gears and their shifters will then be as shown in Fig. 18.

In order to condition the apparatus for effecting this shifting, the operator sets the selector valve 130 in its 3rd position which, as seen from Fig. 16, will provide communication from the interior of the valve body 131 through openings 234, 236 and 237 to the passageways 238, 240 and 241, respectively, and thence to the ports 128, 127 and 126, respectively, of the cylinders 121, 119 and 120. The passageway 239 communicating with the port 129 of the cylinder 122 will now be connected by a groove 251 and the groove 244, to the drain conduit 249. No pressured fluid has as yet been supplied to cylinders 119, 120 and 121, however, since the path for the fluid to the interior of the selector valve 130 is now blocked by the movable member or plug 200, of the governor valve 170. Also, since the shiftable valve body 156 of the main valve is positioned as shown in Fig. 19, the fluid under pressure at the inlet port 263 is prevented from communicating with the crawl port 262 by virtue of the land 255.

Shifting of the gears to the positions indicated in Fig. 18 is now initiated by the operator moving the control lever 161 from position I to position III. This shifts the valve body 156 to the position shown in Fig. 10, the valve body being held in this position by spring detent 167.

This shifting of the valve body 156 now provides communication between the inlet port 263 and the crawl port 262 of the main valve 152 so that fluid under pressure is now supplied through the passageway 285 to the port 224, of the inching valve 213. From thence, the fluid passes between lands 218 and 219 and through the port 223 to the conduit 286 and through the latter to the passageways 181, 180, 179 and 178 of the crawl clutch 171 thereby applying fluid under pressure behind the piston 177 so that the friction members of the clutch are engaged.

Consequently, a crawl speed is now imparted to the spindle 32 from the input shaft 33 through the gears 192 and 193, the torque responsive mechanism 189, the gears 187, 185, 184 and 172, the crawl clutch 171 to the gear 94 which, being in mesh with gear 103, drives the shaft 102 and gears 110 and 112 thus rotating the spindle 32. Since the spindle was initially at rest there will be a torque differential between the input shaft 33 and the spindle 32 until such time as the speed of the spindle has reached the proper crawl speed for gear shifting. Hence, the cam surfaces 191 and 196 of the torque responsive mechanism 189 will be circumferentially displaced with the result that the gear 193 connected with the cam surfaces 196, is shifted to the left as viewed in Fig. 2A moving the lever 199 to the position indicated in broken lines, so that the valve body 200 of the governor valve 170 is maintained at the position shown in Figs. 4 and 5. Therefore, although fluid under pressure has also been supplied from the passageway 285 through the conduit 287 to the port 207 of the governor valve 170, this fluid can only pass through the passageway 208 and the port 209 into the region between the cap 205 and the flow restrictor 206. Hence, the fluid is only gradually admitted to the interior 204 of the valve body 200 and no fluid pressure can as yet pass through the port 211.

When the spindle 32 has reached its crawl speed so that there is no appreciable torque differential between the input and output shafts of the transmission, there will no longer be a relative circumferential displacement between the cam surfaces 191 and 196 so that the spring 198 restores these members and the gear 193 to their positions as shown in Fig. 2A, thus allowing the lever 199 to move to its full line position shown in that figure. Hence, when the fluid pressure in the interior 204 of the valve body 200 has reached a value greater than the force exerted by the spring 210, the valve body 200 will be shifted to the left from its position shown in Figs. 4 and 5, thus bringing the opening 203 into communication with the port 211.

The above mentioned shifting of the governor valve, as a result of equalization of the torques between the input and output shafts, now allows pressured fluid to be supplied from port 207 of that valve around the flow restrictor 206 and through the bore 204 to the opening 203 which is now aligned with the port 211. Hence, the pressured fluid passes through the conduit 227 to the inlet 228 of the selector valve 130 thereby unseating the check valve 229 so that the pressured fluid is now applied through the passageway 230 to the groove 231 and from the latter through the openings 232a and 232b into the interior of the valve body 131. It will be remembered that this valve body 131 was initially set at its 3rd position so that pressured fluid is now supplied from the interior of the valve body 131 through the openings 234, 236 and 237 aligned with the passageways 238, 240 and 241 while passageway 239 is connected to drain. Consequently, fluid under pressure is now supplied through the ports 128, 127 and 126 of the cylinders 121, 119 and 120. Fluid under pressure is also supplied to the left-hand sides of the cylinders 119, 120, 121 and 122 through the passageway 230, port 242 and ports 123, 124 and 125. However, the areas of the pistons available for action of pressured fluid thereagainst are smaller on the sides adjacent ports 123, 124, 125 and 242 than on the sides adjacent the ports 126, 127, 128 and 129. Therefore, since the pistons 89, 99 and 117 are initially disposed at the positions shown in Fig. 18, only piston 108 now moves and this movement is to the left as viewed in the drawings. Consequently, only the gears 101 and 103 are shifted so that the gear 101 now engages gear 100 and gear 103 is disengaged from gear 94, this shifting being effected at the crawl speed thereby preventing clashing of the gears. The other gears remain in the relationships shown in Figs. 2A and 2B.

Simultaneously, with the application of fluid under pressure to the gear shifting fluid motors, fluid under pressure is also supplied at the rear of the flow restricting time delay 151 in the interlocking valve 143. Due to the tortuous passage provided for the fluid through this flow restricting assembly, a predetermined time elapses before sufficient pressure is transmitted therethrough to shift the valve body 145 from its position illustrated in Fig. 14, where it is held by the fluid pressure from conduit 150 acting upon the small diameter end of the extension 148 of the body 145. However, when a predetermined time interval has elapsed, sufficient fluid will have passed through the flow restrictor 151 so that the force exerted on the face of the land 146 exceeds the force exerted upon the reduced diameter portion 148 with the result that the valve body 145 is shifted to the left from its position shown in Fig. 14. This causes the land 146 to move sufficiently to uncover the opening communicating with the drain groove 244 and the land 147 moves sufficiently to place the port 271 in communication with the passageways 230 through the groove 231. Consequently, fluid under pressure will no longer be supplied at the right-hand sides of the pistons 89, 99 and 108 but the fluid which has been supplied thereto will be retained by the check valve 229.

In normal operation, the gear shifting rods or elements 88, 98, 107 and 116 will have all reached their desired positions by the time the fluid pressure in valve 143 becomes great enough to shift the valve body and consequently the openings such as 268 or 269 will have aligned with the opening 267 through the bracket member 118, thus indicating that the gears are either properly engaged or disengaged as the case may be. Therefore, a passage for fluid under pressure is now provided from the passage 230 of the selector valve through the groove 231 and between the lands 146 and 147 of the valve 143 to the port 271, thence through the aligned openings of the gear shifting elements and the bracket 118 to the conduit 266. The conduit 266 is connected with the passageway 264 communicating with the region to the right of the shiftable valve body 156 of the main valve. Hence, the pressured fluid now acts on the valve body 156 and shifts it to the left, from its position shown in Fig. 10, against the force of the detent 167, and to the position shown in Fig. 19, the valve body being held in its new position by engagement of the detent 167 in the right-hand groove 168, see Fig. 10. Therefore, the valve actuating handle 161 is automatically returned to its I position. It will be observed that during the actual shifting of the gears at least one of the openings such as 268 or 269 through one or more gear shifting elements or members will be out of alignment with respect to the opening 267 in the bracket 118, thus blocking application of fluid pressure to effect shifting of the valve body 156. When, however, all the gears are properly positioned, the openings will align as mentioned above thus returning the handle 161 to its position I and thereby advise the operator that the gear shift has been properly completed.

The return of the valve body 156, as just mentioned, has moved the land 255 thereof to a position between the ports 262 and 263, thus terminating the application of fluid pressure to the crawl clutch 171 and the latter is now connected to the drain through the port 262, the space between the lands 254 and 255, and the drain passageways 259, 265. Also, the application of fluid under pressure to the governor valve 170 is terminated and this valve is likewise drained through the same passageways as provide for drainage of the crawl clutch. As mentioned heretofore, the fluid pressure which was applied to the gear shifting fluid motors is not now released, however, since this fluid is trapped by the check valve 229 thus maintaining the gears in their shifted positions. The removing of fluid pressure from the governor valve 170 allows the spring 210 to return the valve body 200 to its position as shown in Figs. 4 and 5, thus preparing the mechanism for further regulation of subsequent gear shifts under control of the torque responsive mechanism 189.

It will be remembered that the assumed rotation of the spindle is to be in the forward direction at the selected speed for which the gears have just been shifted. Therefore, the operator must now move the handle 161 from its neutral or N position, as shown in Fig. 9, to the forward position, indicated F in Fig. 18. In order to effect this movement the operator pushes outwardly slightly on the handle 161 moving the latter from its position I to position II as indicated in Fig. 19, thus enabling the lug 162 to clear the lug 163, the spring pressed plunger 164 being depressed during this movement. The operator may now turn the handle 161 to the forward position and when the handle is thereafter released the plunger 164 returns the handle to its I position while still at the forward position.

Movement of the handle 161 to the F or forward position has rocked the valve body 155 so as to place the passageway 276 in alignment with the port connected with the passageway 278. Therefore, fluid under pressure is now supplied from the inlet port 263 between the lands 255 and 256 of the valve body 156 to the passageway 278, thence through conduit 281 to the passageway 64 which is in communication with the bore 60 and passageways 59 and 58 at the rear of the piston 56, so that the latter is moved to the left as viewed in Fig. 2A. This effects engagement of the friction members of the forward clutch 49 so that the gear 41 is clutched with the shaft 43. Consequently, the spindle 32 is now driven from the input shaft 33 through the gears 39, 41, 82, 84, 92, 94, 100, 101, 110 and 112.

Let it now be assumed that the machining function for which the mechanism has been placed in operation has now been completed and the operator now wishes to stop the rotation of the spindle and of the change speed transmission. Since the handle 161 was automatically returned to its position I while at the F or forward position, the operator now pulls outwardly on the handle 161 to move the latter to position II and thereby clear the stop lug 163 whereupon the control lever 161 may then be rocked laterally from position F to position B which corresponds with the braking position. This will rotate the valve body 155 so that the passageway 276 therethrough is now moved from alignment with the passageway 278, leading to the forward clutch, and is placed in communication with the port 261 which is connected to the brake 73 through the inching valve 213. The fluid under pressure now passes between the lands 217 and 218 of the valve 213 and enters the brake cylinder or operator 73 behind the piston 79 thus moving the latter to engage the friction members of the brake and apply a braking force to the shaft 43. Since the shaft 43 is a part of the transmission, the braking force is also applied to the spindle 32. The rotation of the valve body 155 in moving the passageway 276 as just mentioned has also terminated application of fluid under pressure to the forward clutch and the latter is now connected to the drain through the conduit 281 and a groove such as 277 of the valve body 155. After the spindle has come to rest the operator may then move the control handle 161 to the neutral position, indicated N in Fig. 9, thus terminating the application of fluid under pressure to the brake and connecting the latter to drain through a groove such as 273 of the valve body 155.

Let it now be assumed that the next operational step in the machining cycle is to be a left-hand threading operation at a lower speed, for example, with the gear 82 meshing with gear 84, gear 93 meshing with gear 95, gear 100 meshing with gear 101, and gear 110 meshing with gear 112. This corresponds to the position "1" of the selector valve 131 since in this position openings 234 and 236 will be placed in communication with the ports 128 and 127, respectively, of the fluid motors 121 and 119. The operator may thus position the selector valve 131 either during the previous operating cycle or just prior to initiating this second step. When thus positioned, the selector valve 131 will be conditioned for supplying fluid under pressure to the fluid motors or cylinders 121 and 119 at the right-hand sides of the pistons thereof, as viewed in Fig. 18, while the corresponding sides of the pistons in the motors 117 and 120 will be connected to drain through the grooves or recesses 251 and 252 and the circumferential grooves 244 and 245 communicating therewith.

Shifting of the gears, after the selector valve has been thus set, is initiated by the operator pushing inwardly on the handle 161. This moves the valve body 156 to the right from its position as shown in Fig. 19 to the position as shown in Fig. 10. Hence, the lands of the valve body 156 are again positioned so that the inlet port 263 is connected with the crawl port 262 so that fluid under pressure is supplied to the crawl clutch 171 and to the governor valve 170 as previously described. This shifting of the valve body 156 also terminates the supply of fluid under pressure to the ports and connected passageways for the forward and reverse clutches as well as to the brake even though the handle 161 may not have been previously placed in the neutral position N.

It will now be apparent that the spindle 32 is again connected with the input shaft 33 through the crawl clutch 171 and, so long as the torque of the shaft 33 is different from that of the spindle 32, the torque responsive mechanism prevents the valve body 200 of the governor valve 170 from shifting to the position in which fluid under pressure is supplied to the selector valve and to the gear shifting fluid motors. Fluid under pressure does, however, gradually enter the bore 204 of the governor valve through the flow restricting portion 206 thereof so that, by the time the torque relations of the input and output shafts of the transmission are substantially equal thus moving the lever 199 from its position restraining movement of the valve body 200, sufficient fluid pressure will have been developed in the bore 204 to shift the valve body 200 to a position supplying fluid under pressure through the bore 204 and to the conduit 227 connected with the selector valve 130.

Therefore, fluid under pressure is now supplied through the passageway 230 and the openings 234 and 236 of the selector valve 130 to the passages 238 and 240 which communicate with the fluid motors 121 and 119 at the right-hand sides of the pistons thereof, as viewed in Fig. 18. Simultaneously, fluid under pressure is also supplied to the left-hand sides of the pistons 89, 99, 108 and 117 through the port 242 and the ports 123, 124 and 125. It will be observed, however, that the areas of the pistons against which fluid pressure can act on the left-hand sides thereof, as viewed in Fig. 18, are less than the areas of these pistons available for action of fluid pressure on the right-hand sides thereof. Consequently, while fluid under pressure is applied to both sides of the pistons 89 and 108, the latter do not move from their positions as shown in Fig. 18 since they are held by the greater force exerted by the right-hand sides thereof. However, no fluid under pressure is applied at the right-hand sides of the pistons 98 and 117 since the ports 126 and 129 are now connected to drain. Therefore, the piston 117 will remain at its right-hand position as shown in Fig. 18 and piston 99 will move to the right under the influence of the fluid under pressure applied through the port 123 so that the gears 92 and 93 are shifted to engage the latter gear with the gear 95.

Simultaneously with the application of fluid under pressure to the cylinders 119, 120, 121 and 122, fluid under pressure is also applied through the flow restrictor 151 of the interlock valve 143. Therefore, a predetermined time after the gear shifting is initiated, the valve body 145 will again be moved, as has been previously described, to place the passageway 230 in communication with the port 271, through the space between the lands 146 and 147, thereby supplying fluid under pressure to the conduit 270 of the interlock for the gear shifters. Therefore, when the shifting of the gears is completed so that the passageways through the gear shifting elements are in alignment with the passageways 267 through the bracket 118, fluid under pressure will be supplied therethrough to conduit 266 and passageway 264 thereby causing the shiftable valve body 156 to be returned to its initial position. This terminates the application of fluid under pressure to the crawl clutch, so that the latter is disengaged, and also returns the handle 161 to its position I in the manner which has been previously described thereby indicating to the operator that the gear shift is completed.

The operator then moves the control handle 161 outwardly, from position I to position II, and laterally rocks the handle to the R position thereby rocking the valve body 155 so that the inlet port 263 is now placed in communication with the passageway 279. Consequently, fluid under pressure is now applied through the conduit 282 to the actuator for the reverse clutch 50 thereby engaging the frictional members of the clutch so that the gear 47 is now clutched to the shaft 43 thereby causing the input shaft 33 to drive the transmission and spindle through the gears 40, 44 and 47. The spindle is now rotating in the reverse direction and at the selected speed and will continued to so rotate so long as the handle 161 is left in this position.

If it be desired to stop the spindle at the end of the second operation, the handle 161 may be rocked laterally to the position marked B as has been previously described, thereby rocking the valve body 155 so as to terminate the application of fluid under pressure to the reverse clutch 50 and apply fluid under pressure to the brake 73.

The second operative step in the assumed cycle has been described as a left-hand threading operation at a lower spindle speed than the spindle speed for the first step and with the spindle having been brought to a stop before starting the second operative step. However, if the second operative step had required a different speed from the first step but with the spindle rotating in the same direction, then it would not have been necessary to move the control handle 161 from the F (forward) position in order to obtain the new spindle speed. In such a case, the operator could set the speed selector valve 130 to the desired spindle speed for the second step of the machining cycle of operations while the first step was still in progress. Then, upon completion of the first step and while the spindle is still rotating at the speed for that step, the operator would need merely to move the control handle inwardly from position I to position III while retaining the handle in its F position. This will shift the valve body 156 inwardly as previously described, thus terminating the application of fluid under pressure to the forward clutch 49 and supply fluid under pressure to the crawl clutch 171. Since, however, the speed of the spindle 32 would then be greater than the crawl speed, there would be a torque differential between input shaft 33 and the spindle 32 so that the torque responsive mechanism 189 would prevent shifting of the governor valve body 200, as has been previously described, until the torques of the input and output shafts are substantially the same whereupon the shifting of the gears to provide the preselected speed would automatically occur as will now be apparent. After the shifting of the gears is completed, the resulting alignment of the passageways, such as 267 or 268, through the gear shifting elements with the passageways 267 in the bracket 118 will again return the valve body 156 and the handle 161 to their initial positions. Since the handle 161 was left in its F (forward) position, fluid under pressure will now again be applied to the forward clutch 49 and the application of pressured fluid to the crawl clutch is terminated so that the spindle 32 now begins rotation in the forward direction and at the new speed. Any spindle speed may similarly be preselected and the necessary shifting of the gears effected while the main control handle is in either the F (forward) or R (reverse) positions without necessitating movement of the control handle back to neutral position or to brake position between each such selection and shift.

The inching valve 213 is provided for the purpose of permitting an intermittent slow rotation or inching of the spindle. This inching is at the crawl speed and is obtained by placing the main control lever 161 in its B (brake) and I positions and then pushing on the knob 215a of the valve 213 thereby moving the valve body 215 so that the land 218 is between the passageways 223 and 224 and the land 217 is between the passageways 221 and 222. Consequently, the fluid under pressure from the inlet passageway 263 of the main valve 152, and which passes therethrough and through port 261 to the passageway 230 due to the setting of this valve 152, does not now pass to the brake actuator but is communicated through the inching valve, between the lands 217 and 218, to the port or passageway 223 which is connected by the passageway or conduit 286 to the inlet for the actuator of the crawl clutch 171. Hence, the crawl clutch is engaged so that the spindle is now driven at the crawl speed as will be apparent from the prior description.

The initial positioning of the handle 161 at the B (brake) position prevents fluid under pressure from being supplied to either the forward or reverse clutches 48 and 50, so that inadvertent driving of the spindle at a speed other than the crawl speed is prevented. Furthermore, the operation of the inching valve places the lands 216 and 217 thereof in the position which connects the actuator for the brake 73 to the drain passageway 220. It will also be observed that the operation of the valve 213 moves the land 218 to a position interrupting communication between the ports 224 and 233 of the inching valve. This is to prevent simultaneous inching and gear shifting. It will be further observed that the inching of the spindle cannot be inadvertently effected while the transmission is conditioned for driving the spindle in either the forward or reverse directions or when the handle 161 is at the neutral, N, position, since at these times the port 261 of the valve 152 is connected to the drain so that no fluid under pressure can be supplied to the port 222 of the inching valve and thence to the crawl clutch. If desired, a mechanical interlock may also be provided between the inching valve 213 and the main control valve 152 so that the valve body 215 of the inching valve cannot move inwardly when the valve body 155 of the main valve 152 has been thus actuated, and conversely.

Inching of the spindle is terminated by simply releasing the pressure from the operating knob 215a thereof whereupon the valve body 213 is restored to its initial position shown in Fig. 17 by the spring 226. This interrupts the communication between the ports 222 and 223 thus terminating the application of fluid under pressure to the crawl clutch. The port 222 is now restored to communication with the port 221, through the space between the lands 217 and 218, and hence the fluid pressure applied from the main valve 152 through the passageway 230 passes between the lands 217 and 218 of the inching valve and is applied through the passage or port 221 to the passageway or conduit 283 and 284 connected with the actuator for the brake 73. Consequently, release of the knob 215a of the inching valve applies the brake to the transmission and, since the spindle is rotating at its crawl speed, it is immediately stopped.

It will therefore be apparent that the spindle 32 may be rotated slowly at the crawl speed by holding the inching valve in its operated position or the spindle may be intermittently rotated or inched a desired amount by repeated momentary actuations of the inching valve 213. This facilitates locating the spindle at a desired circumferential position as, for example, in proper relationship for cooperation with a power chuck wrench when a machined workpiece is to be removed from and a new workpiece gripped by the chuck. The inching or partial rotation of the spindle for this purpose may also be effected by hand when the control handle 161 is in N (neutral) position, since at that time the brake and the main clutches are released.

It will now be evident that, in accordance with this invention, a plurality of speeds for a moving part of a machine tool may be provided through a transmission, the gears of which are automatically shifted to a preselected relationship when the torques of the input and output shafts are properly related for effecting the shifting without clashing of the gears. Consequently, the operator need only actuate a selector to determine the gear relationships desired and then operate a single control lever when it is desired to initiate shifting of the gears to provide the selected relationship. Therefore, the selection of a desired speed of the spindle for the next machining operation may be made while the machine is performing the next preceding operation and the selected speed relationship is not established until required by the operator. Furthermore, it is not necessary for the operator to bring the spindle to rest before initiating a change of speed since he may actuate the main control lever for initiating the gear shifting cycle even though the speed of the spindle is not at that time such as to be proper for the shifting. This will not result in injury to the mechanism because the shifting is under the automatic control of a torque responsive device so that the actual shifting of the gears does not occur until the torque relationships of the input and output shafts are proper. This insures that the shifting of the gears will always be effected under the proper conditions without the necessity of the operating exercising any judgment with respect to those conditions. Consequently, the possibility of damaging the transmission by improper shifting is eliminated. Moreover, machining operations are facilitated by the reduction of the number of movements required of the machine operator and by the reduction of the time required for changing speeds of the spindle to substantially the minimum theoretically permissible value.

Although a preferred embodiment of the invention has been illustrated and described in considerable detail, it will be understood that the invention is susceptible of various adaptations and modifications. Consequently, the invention is not to be considered as limited to the structural details herein illustrated and described except as required by the spirit and scope of the appended claims.

Having thus described the invention, I claim:

1. In a machine tool having a movable part, a transmission for moving said part at different rates including input and output shafts and shiftable elements providing selected speeds of said output shaft relative to the input shaft, power operated means for effecting shifting of said shifable elements, settable selector means adapted to selectively connect a source of power to said means for shifting said elements, and means to control the application of power to said power operated means including a portion movable in response to the torque differential between said input and output shafts to selectively permit or prevent application of power to said power operated means through said selector means so that shifting of said shiftable elements in accordance with the setting of said selector means is prevented until the torque of the output shaft bears a predetermined relationship to the torque of said input shaft.

2. In a machine tool having a movable part, a transmission for moving said part at different rates including input and output shafts and shiftable elements providing selected speeds of said output shaft relative to the input shaft, power operated means for effecting shifting of said shiftable elements, settable selector means adapted to selectively connect a source of power to said means for shifting said elements, and means operatively connected with said input and output shafts and including a movable member controlled by the torque differential between said input and output shafts and positionable to selectively permit or prevent application of power to said power operated means through said selector means, whereby shifting of said shiftable elements in accordance with the setting of said selector means is prevented until the torque of the output shaft bears a predetermined relationship to the torque of said input shaft.

3. In a machine tool having a movable part, a transmission for moving said part at different rates including input and output shafts and shiftable gears providing selected speeds of said output shaft relative to the input shaft, power operated means for effecting shifting of said gears, settable selector means adapted to selectively connect a source of power to said means for shifting said gears, means to control the application of power to said power operated means including a portion movable from a position in which application of power to said power operated means through said selector means is prevented to a position in which the said application of power is permitted, and means responsive to the torque differential between said input and output shafts for governing movement of said portion, whereby shifting of said gears in accordance with the setting of said selector means is prevented until the torque of the output shaft bears a predetermined relationship to the torque of said input shaft.

4. The combination as defined in claim 3 and further comprising means normally urging said movable portion to the position thereof in which it prevents application of power from said source to said power operated means, and means for applying a force to said movable portion to effect movement thereof to its other position, the said means for governing movement of said movable portion being operative to prevent movement thereof in response to said force until the torques of said shafts bear the said predetermined relationship.

5. The combination as defined in claim 4 and further comprising time delay means associated with said movable portion to prevent movement thereof until a predetermined time after the said force is directed thereagainst.

6. The combination as defined in claim 3 wherein the said transmission further comprises a pair of clutches adapted to be selectively operated to effect rotation of said output shaft in either the forward or reverse directions, and a single manually operable control lever operable to control the application of power to said power operated means through said selector means and to selectively actuate the said clutches.

7. The combination as defined in claim 6 wherein the said transmission further comprises a brake means and means operative in response to actuation of said control lever to one position thereof to actuate said brake means.

8. In a machine tool having a movable part, a transmission for moving said part at different rates including input and output shafts and shiftable gears providing selected speeds of said output shaft relative to the input shaft, means in said transmission including a power operated clutch for imparting a slow non-working speed to said output shaft, power operated means for effecting shifting of said gears, settable selector means adapted to selectively connect a source of power to said means for shifting said gears, manually operable control means selectively operable to apply power to said clutch and to said gear shifting means in accordance with the setting of said selector means, and means to control the application of power connected intermediate said control means and said selector means and including a portion operatively connected with said input and output shafts for movement in response to the torque differential between said shafts to selectively permit or prevent application of power to said gear shifting means through said selector means, whereby actuation of said control means first imparts a non-working speed to said output shaft and thereafter effects shifting of said gears after the torque of the output shaft attains a predetermined relationship to the torque of said input shaft.

9. The combination as defined in claim 8 and further comprising means responsive to shifting of said gears in accordance with the setting of said selector means to terminate operation of said clutch and thereby terminate the application of said non-working speed to said output shaft.

10. The combination as defined in claim 8 and wherein the said transmission further comprises a pair of clutches adapted to be selectively operated to effect rotation of said output shaft in either the forward or reverse directions, and the said control means comprises a single member operatively connected to control the application of power to said power operated means through said selector means and to selectively control actuation of the said clutches.

11. The combination as defined in claim 10 and wherein said transmission further comprises a brake means and means operative in response to actuation of said control member to one position thereof to actuate said brake.

12. The combination as defined in claim 11 and further comprising a member manually movable to simultaneously release said brake means and apply power for actuating the said clutch which imparts the slow non-working speed to the output shaft to thereby effect inching of the output shaft and of the said movable part connected therewith.

13. In a machine tool having a movable part, a transmission for moving said part at different rates including input and output shafts and shiftable elements providing selected speeds of said output shaft relative to the input shaft, fluid pressure actuated means for shifting said shiftable elements, a source of fluid under pressure, settable selector valve means operatively connected to said source of fluid under pressure and to said fluid pressure actuated means to selectively direct fluid under pressure to the latter, valve means having a portion movable to selectively permit or prevent application of fluid under pressure to said fluid pressure actuated means as determined by the setting of said selector valve means, and means operatively connected to said input and output shafts for movement in response to the torque differential therebetween to control movement of said portion of the last-mentioned valve means, whereby shifting of the said shiftable elements in accordance with the setting of said selector valve means is prevented until the torque of the output shaft bears a predetermined relationship to the torque of said input shaft.

14. In a machine tool having a movable part, a transmission for moving said part at different rates including input and output shafts and shiftable elements providing selected speeds of said output shaft relative to the input shaft, fluid pressure actuated means for shifting said shiftable elements, a source of fluid under pressure, selector valve means settable to selectively direct the application of fluid under pressure to said fluid pressure actuated means, main valve means for selectively directing fluid under pressure from said source to said selector valve for effecting shifting of said shiftable elements in accordance with the setting of said selector valve, a governor valve connected intermediate the said selector and main valve means and having a portion movable to selectively permit or prevent application of fluid under pressure to said fluid pressure actuated means, and means operatively connected to said input and output shafts for movement in response to the torque differential therebetween to control movement of said portion of the governor valve, whereby shifting of the said shiftable elements is prevented until the torque of the ouput shaft bears a predetermined relationship to the torque of said input shaft.

15. The combination as defined in claim 14 and further comprising means automatically interposing a time delay between the actuation of said main valve and movement of the said portion of the governor valve to the position thereof which permits application of fluid under pressure to said selector valve.

16. In a machine tool having a movable part, a transmission for moving said part at different rates including input and output shafts and shiftable gears providing selected speeds of said output shaft relative to the input shaft, fluid pressure actuated means for shifting said gears, a source of fluid under pressure, selector valve means settable to select the application of fluid under pressure to said fluid pressure actuated means, main valve means for selectively directing fluid under pressure from said source to said selector valve for effecting shifting of said gears in accordance with the setting of said selector valve means, a governor valve connected intermediate the said selector and main valve means and having a portion movable to selectively permit or prevent communication between said selector valve means and said main valve means, and means including a portion movable in response to the torque differential between said input and output shafts and positioned for cooperation with the said movable portion of the governor valve to control the movement thereof, whereby shifting of the gears of the transmission can be effected only when the torque of the output shaft of the transmission is in predetermined relationship to the torque of said input shaft.

17. In a machine tool having a movable part, a transmission for moving said part at different rates including input and output shafts and shiftable elements providing selected speeds of said output shaft relative to the input shaft, means in said transmission including a fluid pressure operated clutch for imparting a slow non-working speed to said output shaft, fluid pressure actuated means for shifting said shiftable elements, selector valve means settable to selectively direct fluid under pressure to said fluid pressure actuated means, a source of fluid under pressure, main valve means for controlling the application of fluid under pressure from said source to said clutch and to said selector valve means, a governor valve having a portion movable to selectively permit or prevent communication between said selector valve means and said main valve means, and means operatively connected to said input and output shafts for movement in response to the torque differential therebetween to control movement of said portion of the governor valve, whereby actuation of said main valve first imparts a non-working speed to said output shaft and thereafter effects shifting of the said shiftable elements when the torque of the output shaft is substantially the same as that of said input shaft.

18. In a machine tool having a movable part, a tranmission for moving said part at different rates including input and output shafts and shiftable elements providing selected speeds of said output shaft relative to the input shaft, means in said transmission including a fluid pressure operated clutch for imparting a slow non-working speed to said output shaft, fluid pressure actuated means for shifting said shiftable elements, selector valve means settable to selectively direct fluid under pressure to said fluid pressure actuated means, a source of fluid under pressure, main valve means connected to control application of fluid under pressure to said clutch means and to said selector valve means, a governor valve connected intermediate said main valve and said selector valve and having a portion movable to selectively permit or prevent communication between said selector valve means and said main valve means, means operatively connected to said input and output shafts for movement in response to the torque differential therebetween to control movement of said portion of the governor valve, and means movable in response to application of fluid under pressure to said selector valve means to cause a portion of said main valve means to move to a position terminating the supply of fluid under pressure to said clutch, whereby actuation of said main valve first imparts a non-working speed to said output shaft, then effects shifting of the said shiftable elements when the torque of the output shaft is substantially the same as that of said input shaft, and thereafter terminates the non-working speed of said output shaft.

19. The combination as defined in claim 18 and further comprising manually operable valve means connected between said source of fluid under pressure and said clutch to control application of fluid under pressure to the latter for inching said movable part at the said non-working speed without effecting shifting of said shiftable elements.

20. In a machine tool having a movable part, a transmission for moving said part at different rates including input and output shafts and shiftable gears providing selected speeds of said output shaft relative to said input shaft, a pair of fluid operated clutches in said transmission selectively operable to provide rotation of said output shaft in either a forward or reverse direction, fluid pressure actuated means for shifting said gears, a source of fluid under pressure, selector valve means settable to selectively direct fluid under pressure from said source to said fluid pressure actuated means, a main valve means selectively movable to positions controlling the application of fluid under pressure from said source to said selector valve means and to either of said pair of clutches, a valve having a portion movable to selectively permit and prevent communication of fluid under pressure between said main valve means and said selector valve means, and means operatively connected to said input and output shafts for movement in response to the torque differential therebetween to control movement of the said portion of the governor valve, whereby shifting of said gears in accordance with the setting of said selector valve means is prevented until the torque of the output shaft bears a predetermined relationship to the torque of said input shaft.

21. In a machine tool having a movable part, a transmission for moving said part at different rates including input and output shafts and shiftable gears providing selected speeds of said output shaft relative to said input shaft, a pair of fluid operated clutches in said transmission selectively operable to provide rotation of said output shaft in either a forward or reverse direction, means in said transmission including a fluid pressure operated clutch for imparting a slow non-working speed to said output shaft, fluid pressure actuated means for shifting said gears, a source of fluid under pressure, selector valve means settable to selectively direct fluid under pressure to said fluid pressure actuated means, a main valve means selectively movable to positions controlling the application of fluid under pressure from said source to the said selector valve means and the last-mentioned clutch means and to either of said pair of clutches, a governor valve having a portion movable to selectively permit and prevent communication of fluid under pressure between said main valve means and said selector valve means, and means operatively connected to said input and output shafts for movement in response to the torque differential therebetween to control movement of the said portion of the governor valve, whereby actuation of said main valve means first results in imparting a non-working speed to said output shaft and thereafter causes automatic shifting of said gears when the torque of the output shaft attains a predetermined relationship to the torque of said input shaft.

22. In a machine tool having a movable part, a transmission for moving said part at different rates including input and output shafts and shiftable gears providing selected speeds of said output shaft relative to said input shaft, a pair of fluid operated clutches in said transmission selectively operable to provide rotation of said output shaft in either a forward or reverse direction, means in said transmission including a fluid pressure operated clutch for imparting a slow non-working speed to said output shaft, fluid pressure actuated means for shifting said gears, a source of fluid under pressure, selector valve means settable to selectively direct fluid under pressure to said fluid pressure actuated means, a main valve means movable in one plane for controlling the application of fluid under pressure from said source to the last-mentioned clutch means and to the said selector valve means and movable in a second plane to selectively apply fluid under pressure to either of said pair of clutches, a governor valve having a movable portion selectively permitting and preventing communication of fluid under pressure between said main valve means and said selector valve means, means operatively connected with said input and output shafts and including a member responsive to the torque differential therebetween and cooperating with the said movable portion of the governor valve to prevent shifting thereof until the torque of said output shaft bears a predetermined relationship to that of said input shaft, and means responsive to shifting of said gears in accordance with the setting of said selector valve means for moving said main valve means to a position terminating application of fluid under pressure to the said clutch which imparts the non-working speed to the output shaft.

23. In a machine tool having a movable part, a transmission for moving said part at different rates including input and output shafts and shiftable gears providing selected speeds of said output shaft relative to said input shaft, a pair of fluid operated clutches in said transmission selectively operable to provide rotation of said output shaft in either a forward or reverse direction, means in said transmission including a fluid pressure operated clutch for imparting a slow non-working speed to said output shaft, fluid pressure actuated means for shifting said gears, a source of fluid under pressure, selector valve means settable to selectively direct fluid under pressure from said source to said fluid pressure actuated means, main control valve means movable in one direction for controlling the application of fluid under pressure from said source to the last-mentioned clutch means and to the said selector valve means and movable in another direction to selectively apply fluid under pressure to either of said pair of clutches, a governor valve having a movable portion selectively permitting and preventing communication of fluid under pressure between said main valve means and said selector valve means, means normally urging the said movable portion to the position preventing communication between said selector and said main valve means, means controlled by movement of said main valve in the first-mentioned direction for applying fluid under pressure to said portion for moving the latter to the position permitting communication between said main and selector valve means, and means responsive to the torque differential between said input and output shafts and cooperating with the said movable portion of the governor valve to prevent shifting thereof in response to the said application of fluid pressure thereto until the torque of said output shaft bears a predetermined relationship to that of said input shaft.

24. The combination as defined in claim 23 and further comprising flow restricting means in the path of the fluid under pressure applied to said movable portion of said governor valve thereby interposing a time delay between the actuation of said main control valve means and development of sufficient force against said portion to effect movement thereof.

25. The combination as defined in claim 23 and further comprising means responsive to shifting of said gears in accordance with the setting of said selector valve means for applying fluid under pressure to said main control valve means thereby moving the latter to a position where it terminates application of fluid under pressure to the said clutch which imparts a non-working speed to the output shaft.

26. The combination as defined in claim 23 and wherein the said transmission further comprises a brake means, fluid pressure actuated means for operating said brake means, and means connected with said main valve means for conducting fluid under pressure to the last-mentioned fluid pressure actuated means under control of said main valve means.

27. The combination as defined in claim 26 and further comprising manually operable inching valve means connected by fluid passageways to said main control valve means, to said means for actuating said brake means, and to the said fluid pressure actuated clutch for imparting the non-working speed to the output shaft, the said inching valve means including a portion movable to simultaneously terminate application of fluid under pressure to the brake actuating means and to apply fluid under pressure to operate the said clutch for imparting the non-working speed to said output shaft.

RALPH H. SCHUMAN.

References Cited in the file of this patent

UNITED STATES PATENTS

| Number | Name | Date |
|---|---|---|
| 2,090,614 | Clark | Aug. 24, 1937 |
| 2,096,645 | Murray | Oct. 19, 1937 |
| 2,110,173 | Pohl et al. | Mar. 8, 1938 |
| 2,164,884 | Nenninger et al. | July 4, 1939 |
| 2,208,153 | Budlong | July 16, 1940 |
| 2,486,524 | Dulaney | Nov. 1, 1949 |
| 2,555,242 | Nenninger | May 29, 1951 |